(12) United States Patent
Hou (10) Patent No.: US 12,298,630 B2
(45) Date of Patent: May 13, 2025

(54) DISPLAY PANEL AND ARRAY SUBSTRATE THEREOF

(71) Applicant: Shenzhen China Star Optoelectronics Semiconductor Display Technology Co., Ltd., Guangdong (CN)

(72) Inventor: Yuchen Hou, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/790,189

(22) PCT Filed: Jun. 1, 2022

(86) PCT No.: PCT/CN2022/096631
§ 371 (c)(1),
(2) Date: Nov. 30, 2023

(87) PCT Pub. No.: WO2023/226072
PCT Pub. Date: Nov. 30, 2023

(65) Prior Publication Data
US 2024/0210765 A1    Jun. 27, 2024

(30) Foreign Application Priority Data

May 24, 2022   (CN) .......................... 20221057436.4

(51) Int. Cl.
*G02F 1/1343*    (2006.01)
*G02F 1/1337*    (2006.01)

(52) U.S. Cl.
CPC ...... *G02F 1/134309* (2013.01); *G02F 1/1337* (2013.01)

(58) Field of Classification Search
CPC .................. G02F 1/133707; G02F 1/133345
See application file for complete search history.

(56) References Cited

U.S. PATENT DOCUMENTS

| 2001/0048499 | A1 | 12/2001 | Numano et al. |
| 2009/0059152 | A1* | 3/2009 | Kamada ............ G02F 1/133345 349/144 |
| 2013/0155357 | A1* | 6/2013 | Ota ................... G02F 1/133707 349/110 |

FOREIGN PATENT DOCUMENTS

| CN | 105842928 A * | 8/2016 | ....... G02F 1/133707 |
| CN | 110703504 | 1/2020 | |

(Continued)

OTHER PUBLICATIONS

International Search Report and the Written Opinion Dated Dec. 16, 2022 From the International Searching Authority Re. Application No. PCT/CN2022/096631 and Its Translation Into English. (15 Pages).

*Primary Examiner* — Jessica M Merlin (57) ABSTRACT

The present application provides a groove in an area on a buffer layer that is directly opposite to a slit of a pixel electrode, so as to accommodate an alignment film in a corresponding area and increase a thickness of the alignment film. An increase in the thickness of the alignment film increases an anchoring force to liquid crystal molecules in the corresponding area, which makes the liquid crystal molecules in the corresponding area be deflected more easily, thereby solving a technical problem in the prior art that a relatively weak electric field in the area directly opposite to the slit results in an insufficient deflection angle of liquid crystals and insufficient transmission strength in this area.

8 Claims, 4 Drawing Sheets

(56) References Cited

FOREIGN PATENT DOCUMENTS

| | | | |
|---|---|---|---|
| CN | 111580296 | | 8/2020 |
| JP | 2011-186285 | | 9/2011 |
| JP | 2011186285 A | * | 9/2011 |
| KR | 10-2004-0056020 | | 6/2004 |
| KR | 20170116273 A | * | 10/2017 |

* cited by examiner

DISPLAY PANEL AND ARRAY SUBSTRATE THEREOF

RELATED APPLICATIONS

This application is a National Phase of PCT Patent Application No. PCT/CN2022/096631 having International filing date of Jun. 1, 2022, which claims the benefit of priority of China Patent Application No. 202210574736.4 filed on May 24, 2022. The contents of the above applications are all incorporated by reference as if fully set forth herein in their entirety.

FIELD AND BACKGROUND OF THE INVENTION

The present application relates to a display technology, and more specifically, to a display panel and an array substrate thereof.

A liquid crystal display includes a liquid crystal layer of liquid crystal molecules, a pixel electrode and a common electrode for generating an electric field to control orientations of the liquid crystal molecules in the liquid crystal layer, and an alignment film for controlling liquid crystals to form a pre-tilt angle. Under action of the electric field generated by the pixel electrode and the common electrode, the liquid crystals are deflected and a propagation path of light is changed to realize display and luminescence. Depending on a magnitude of a voltage and a strength of the electric field, an angle at which the liquid crystals are deflected also varies, thereby displaying different pictures.

At present, in order to control the pre-tilt angle of each liquid crystal molecule, a slit is defined on the pixel electrode. An electric field in an area directly opposite to the slit is relatively weak, and has a relatively weak control force to the deflection of the liquid crystals, which may easily result in an insufficient deflection angle of the liquid crystals. This results in insufficient transmission strength in this area and forms dark spots and dark lines, affecting a display effect of a display panel.

SUMMARY OF THE INVENTION

Embodiments of the present application provide a display panel and an array substrate thereof, which can solve a technical problem in the prior art that a relatively weak electric field in an area directly opposite to a slit on a pixel electrode results in insufficient transmission strength.

Technical Solution

An embodiment of the present application provides an array substrate, comprising:
- a buffer layer, a side of the buffer layer defined with a plurality of grooves;
- a pixel electrode, arranged on the side of the buffer layer that is defined with the grooves, wherein the pixel electrode is defined with a plurality of slits, and the plurality of slits are arranged in a one-to-one correspondence with the plurality of the grooves; a first alignment film arranged on a side of the pixel electrode facing away from the buffer layer and filling the grooves and the slits, and a side of the first alignment film facings away from the pixel electrode being a flat surface. In some embodiments of the present application, a width of the groove is no less than a width of the slits.

In some embodiments, a depth of the groove is no more than 10% of a maximum thickness of the first alignment film.

In some embodiments, the depth of the groove is no more than 0.01 micrometers.

In some embodiments, a distance between groove walls on two opposite sides of the groove is gradually decreased along a direction from a side of the buffer layer facing the pixel electrode to a direction facing away from the pixel electrode.

In some embodiments, the groove walls on two opposite sides of the grooves are inclined.

In some embodiments, the pixel electrode comprises a main body portion and a plurality of extension portions; the main body portion is defined with the plurality of slits; the extension portions are arranged corresponding to the slits, are connected to sidewalls of the slits, and protrude into the grooves, and the extension portions are attached to groove walls of the grooves.

In some embodiments, a side of the extension portions facing away from the buffer layer is inclined and parallel to the groove walls of the grooves.

In some embodiments, sidewalls on two opposite sides of the slits are inclined, and a width of the slits is gradually narrowed along a direction from a side of the slits attached to the first alignment film to a side of the slits attached to the buffer layer.

Correspondingly, an embodiment of the present application also provides a display panel, comprising:
- an array substrate as described above;
- a liquid crystal layer, arranged on a side of the array substrate and attached to a first alignment film.
- a color filter substrate arranged on a side of the liquid crystal layer facing away from the array substrate and attached to the liquid crystal layer.

In the embodiment of the present application, the groove is defined in an area on the buffer layer that is directly opposite to the slit of the pixel electrode, so as to accommodate the alignment film in a corresponding area and increase a thickness of the alignment film. An increase in the thickness of the alignment film increases an anchoring force to liquid crystal molecules in the corresponding area, which makes the liquid crystal molecules in the corresponding area be deflected more easily, thereby solving the technical problem in the prior art that a relatively weak electric field in an area directly opposite to the slits results in an insufficient deflection angle of the liquid crystals and insufficient transmission strength in this area.

BRIEF DESCRIPTION OF THE SEVERAL VIEWS OF THE DRAWINGS

In order to describe the technical solutions in the embodiments of the present application more clearly, the drawings that are used in the description of the embodiments are briefly introduced hereinafter. Obviously, the drawings in the following description are only some embodiments of the present application. For those skilled in the art, other drawings can also be obtained from these drawings without any creative effort.

DESCRIPTION OF REFERENCE NUMBERS

100, array substrate; 110, first substrate; 120, buffer layer; 121, groove; 130, pixel electrode; 131, main body portion; 132, extension portion; 133, slit area; 134, slit; 140, first alignment film; 141, main body film layer; 142, thickening film layer; 200, liquid crystal layer; 300, color filter substrate; 310, second substrate; 320, common electrode; 330, second alignment film.

DESCRIPTION OF SPECIFIC EMBODIMENTS OF THE INVENTION

The technical solutions in the embodiments of the present application will be clearly and completely described below with reference to the drawings in the embodiments of the present application. Obviously, the described embodiments are only a part of the embodiments of the present application, not all of the embodiments. Based on the embodiments in the present application, all other embodiments that are obtained by those skilled in the art without creative work fall within the protection scope of the present application. In addition, it should be understood that the specific embodiments described herein are only used to illustrate and explain the present application, but not to limit the present application. In the present application, unless otherwise stated, the directional words used such as "up" and "down" generally refer to upper and lower sides of the device in actual use or in a working state, specifically the drawing direction in the accompanying drawings. While "inside" and "outside" is relative to an outline of the device.

Embodiments of the present application provide a display panel and an array substrate 100 thereof, which will be described respectively in detail below. It should be noted that a description order of the following embodiments is not intended to limit a preferred order of the embodiments.

The present application provides a display panel, and the display panel can be installed in various products with display functions. For example, electronic products may be smart terminals, laptops, photographic equipment, wearable devices, electronic scales, vehicle-mounted displays, televisions, and the like.

Figure 1:
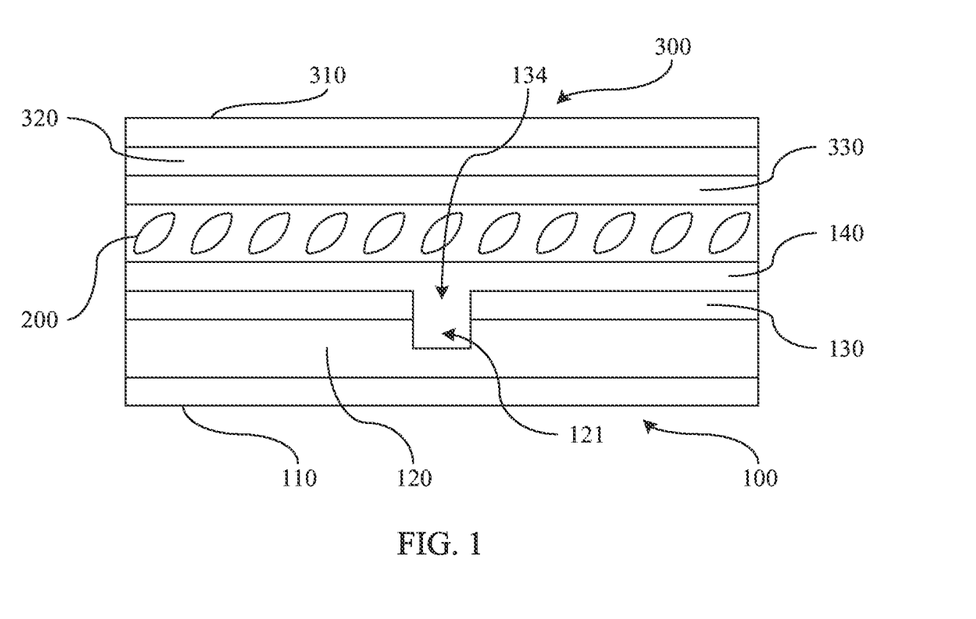
FIG. 1 is a structural schematic diagram of a display panel provided by an embodiment of the present application.

Please refer to FIG. 1, the display panel includes an array substrate 100, a liquid crystal layer 200, and a color filter substrate 300. The array substrate 100 and the color filter substrate 300 are arranged opposite to each other. The liquid crystal layer 200 is arranged between the array substrate 100 and the color filter substrate 300. One side of the liquid crystal layer 200 is attached to the array substrate 100, and another side of the liquid crystal layer 200 is attached to the color filter substrate 300.

The array substrate 100 includes a first substrate 110, a buffer layer 120, a pixel electrode 130, and a first alignment film 140.

The first substrate 110 is a flat plate layer, which is used to carry the buffer layer 120, the pixel electrode 130, and the first alignment film 140.

The buffer layer 120 is arranged on a side of the first substrate 110 and is made of a resin material such as polyfluoroalkoxy (PFA) resin. A thickness of the buffer layer 120 is generally between 1 micrometer and 1.5 micrometers, and is 1.3 micrometers in the embodiment of the present application.

The pixel electrode 130 is attached to a side of the buffer layer 120 facing away from the first substrate 110, and is arranged corresponding to a sub-pixel in a pixel structure of the display panel. The pixel electrode 130 is used to form an electric field to control deflection of liquid crystal molecules in the liquid crystal layer 200. Generally, the pixel electrode 130 is made of a transparent conductive material such as indium tin oxide (ITO).

The first alignment film 140 is attached to a side of the pixel electrode 130 facing away from the buffer layer 120 and is attached to the liquid crystal layer 200. A side of the first alignment film 140 facing away from the pixel electrode 130 is a flat surface. The first alignment film 140 is generally made of a material such as polyimide (PI), and is a thin film-like film layer. The first alignment film 140 is used to provide an anchoring force to the liquid crystal molecules in the liquid crystal layer 200, so as to form a defined pre-tilt angle.

In the embodiment of the present application, the above-mentioned pixel electrode 130 is defined with a plurality of slits 134, and positions and shapes of the slits 134 can be set according to actual requirements. In an embodiment of the present application, please refer to FIG. 2 in combination, the pixel electrode 130 includes four slit areas 133 distributed at four corners. The slits 134 in each slit area 133 are arranged parallel to each other, and all point from a center of the pixel electrode 130 to a corner where the slit area 133 is located, so as to ensure that the liquid crystal molecules directly opposite to the pixel electrode 130 have pre-tilt angles in four different directions, thereby ensuring that the display panel has maximum viewing angles.

Figure 2:
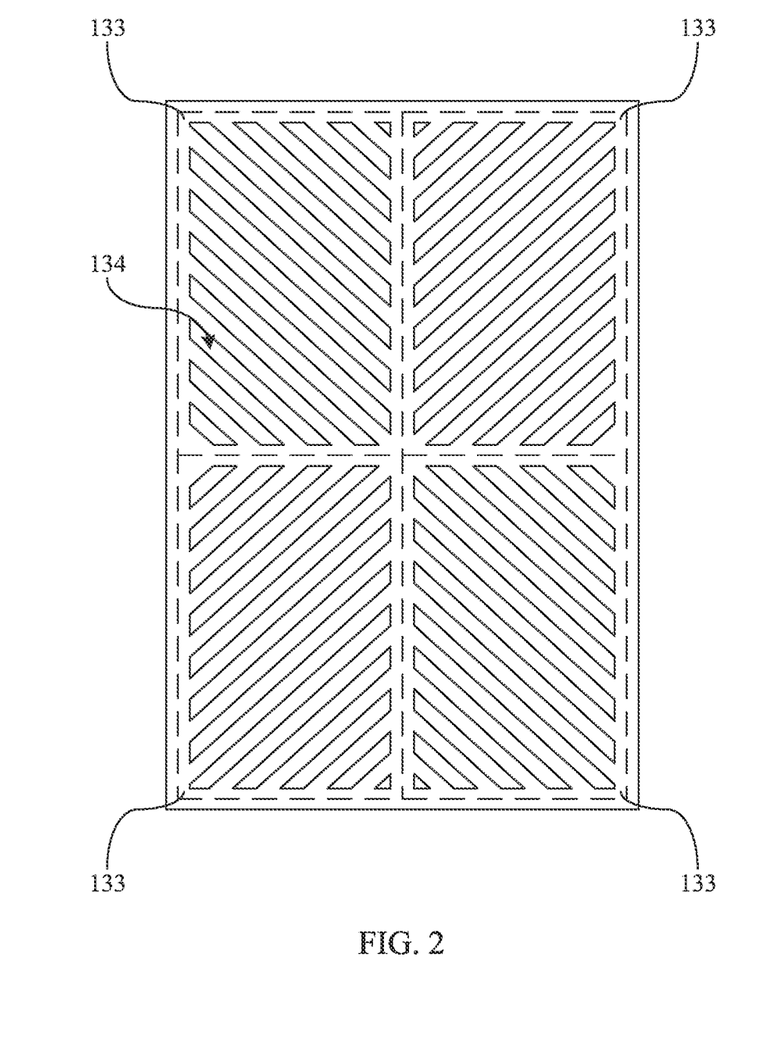
FIG. 2 is a structural schematic diagram of a pixel electrode provided by an embodiment of the present application.

Generally, each slit 134 forms an angle of 45 degrees with a side edge of the pixel electrode 130, to ensure the slit 134 to form an angle of 45 degrees with polarized light in two vertical directions, so that a transmittance of the display panel may be maximized.

Correspondingly, a plurality of grooves 121 are defined on a side of the buffer layer 120 that is attached to the pixel electrode 130, and each groove 121 is arranged directly opposite to each of the slits 134. The groove 121 and a corresponding slit 134 form an accommodation groove for accommodating the first alignment film 140.

Figure 3:
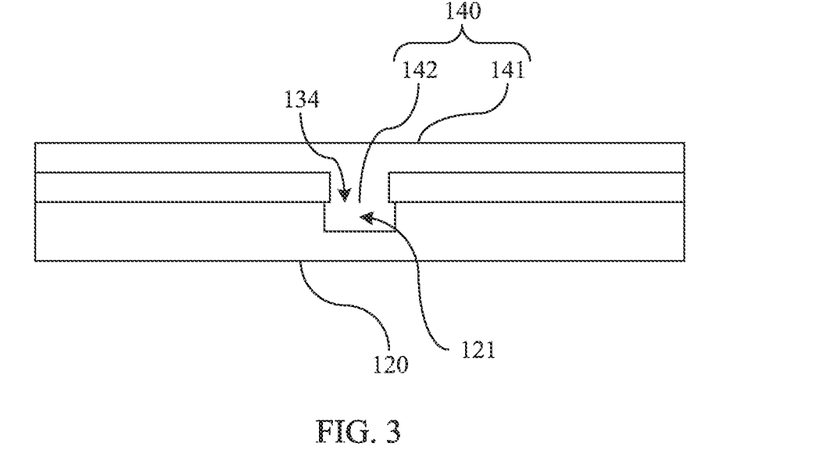
FIG. 3 is a structural schematic diagram of an array substrate provided by a first embodiment of the present application.
Figure 4:
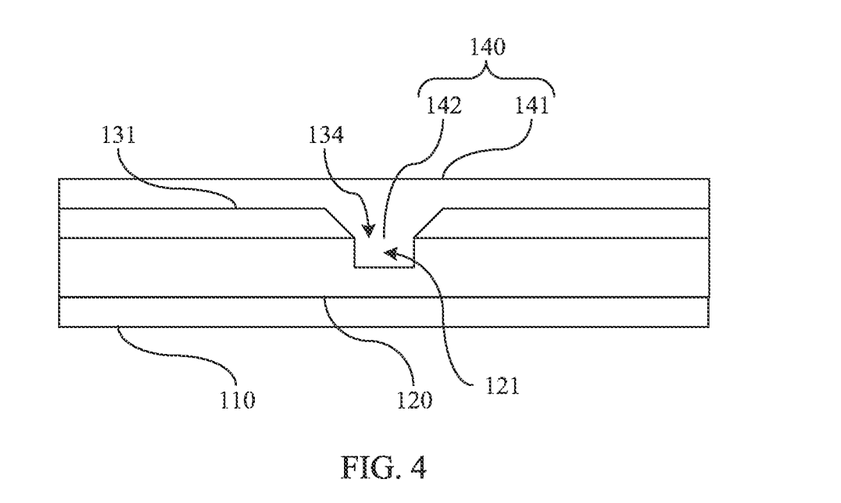
FIG. 4 is a structural schematic diagram of an array substrate provided by a second embodiment of the present application.
Figure 5:
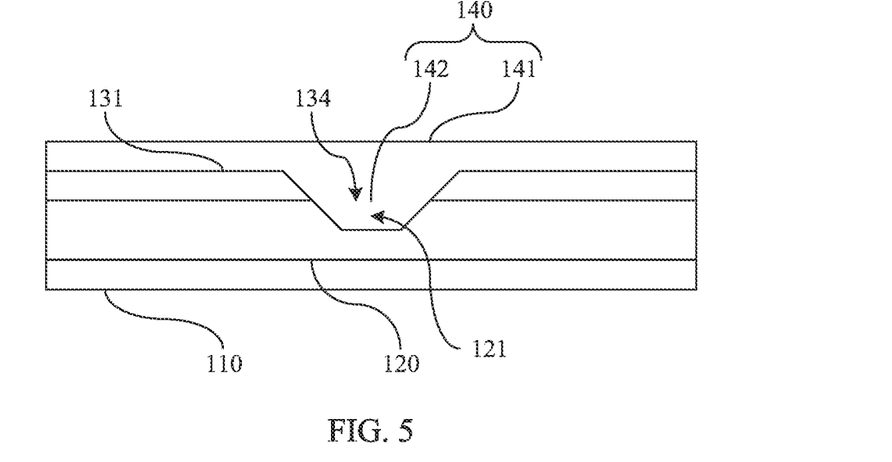
FIG. 5 is a structural schematic diagram of an array substrate provided by a third embodiment of the present application.

In an embodiment of the present application, please refer to FIGS. 3 to 5 in combination, the first alignment film 140 includes a main body film layer 141 and a thickening film layer 142 that are integrally formed. The main body film layer 141 is attached to the pixel electrode 130, and the thickening film layer 142 is arranged on a side of the main body film layer 141 facing the pixel electrode 130 and fills the groove 121 and the slit 134, so that a film thickness of an alignment film in an area directly opposite to the slit 134 is increased. By increasing the thickness of the alignment film in the area directly opposite to the slit 134 of the pixel electrode 130, an anchoring force to the liquid crystal molecules is increased, which makes the liquid crystal molecules in a corresponding area be deflected more easily, thereby solving the technical problem in the prior art that a relatively weak electric field in the area directly opposite to the slit 134 results in an insufficient deflection angle of the liquid crystals and insufficient transmission strength in this area.

In an embodiment of the present application, a width of the groove 121 is no less than a width of the slit 134, as shown in FIG. 1 and FIG. 3. In some embodiments of the present application, as shown in FIG. 1, the width of the groove 121 is equal to the width of the slit 134. At this time, a width of the thickening film layer 142 of the first alignment film 140 is equal to the width of the slit 134. The anchoring force to the liquid crystal molecules in a weak electric field area generated by defining the slit 134 on the pixel electrode 130 is increased, and the liquid crystal molecules are deflected more easily, thereby solving the technical problem that the relatively weak electric field in the area directly opposite to each slit 134 results in an insufficient deflection angle of the liquid crystals and the insufficient transmission strength in this area, which may save more materials.

In other embodiments of the present application, as shown in FIG. 3, the width of the groove 121 is wider than the width of the slit 134, so as to ensure that the thickening film layer 142 may completely cover the area directly opposite to the slit 134 defined on the pixel electrode 130, which may prevent a situation that the anchoring force to the liquid crystal molecules directly opposite to an edge of the slit 134 is insufficient due to process factors such as processing errors.

In some embodiments of the present application, a depth of the groove 121 is within about 10% of a total thickness of the first alignment film 140, to ensure that a thickness of the thickening film layer 142 in the first alignment film 140 is no more than 10% of the total thickness of the first alignment film 140. If the thickness of the thickening film layer 142 is too large, the anchoring force to the liquid crystal molecules in a directly opposite area thereof will be too large, which affects control of the deflection of the liquid crystal molecules by the pixel electrode 130. In an embodiment of the present application, a thickness of the main body film layer 141 of the first alignment film 140 is 0.09 micrometers, the thickness of the thickening film layer 142 is 0.01 micrometers, and the total thickness of the first alignment film 140 is 0.1 micrometers. Generally, the total thickness of the first alignment film 140 is about 0.1 micrometers. Thus, in some embodiments of the present application, the groove depth of the groove 121 is no more than 0.01 micrometers.

In the embodiment of the present application, the above-mentioned groove 121 may have various cross-sectional shapes, such as rectangular, trapezoidal, triangular, arc-shaped, and the like.

In some embodiments of the present application, please refer to FIG. 4, a cross section of the above-mentioned groove 121 is in a rectangular shape, and sidewalls on two sides of the slit 134 are inclined. The width of the slit 134 is gradually narrowed from a side of the slit 134 attached to the first alignment film 140 to a side of the slit 134 attached to the buffer layer 120, so that the thickening film layer 142 of the first alignment film 140 is gradually thickened from two sides to a middle, and meanwhile the electric field of two sides of the area directly opposite to the groove 121 is controlled to decrease slowly, which makes the anchoring force of the first alignment film 140 to the liquid crystal molecules in the liquid crystal layer 200 be gradually strengthened from two sides of the groove 121 to a center of the groove 121, and the electric field force of the pixel electrode 130 to the liquid crystal molecules in the liquid crystal layer 200 is gradually weakened from the two sides of the groove 121 to the center of the groove 121 to the center of the groove 121, which can eliminate a tolerance caused by processing technology to a certain extent and make a level of case of deflection of the liquid crystal molecules everywhere be kept same.

In some embodiments of the present application, please refer to FIG. 5, the groove walls on two sides of the above-mentioned groove 121 are inclined, so that the cross section of the groove 121 is in an isosceles trapezoid shape. The sidewalls on two sides of the slit 134 are inclined and located on a same inclined side as the groove wall on a same side. The width of the slit 134 is gradually narrowed from the side of the slit 134 attached to the first alignment film 140 to the side of the slit 134 attached to the buffer layer 120, so that the thickening film layer 142 of the first alignment film 140 is gradually thickened from two sides to the middle, and meanwhile the electric field of two sides of the area directly opposite to the groove 121 is controlled to decrease slowly, which makes the anchoring force of the first alignment film 140 to the liquid crystal molecules in the liquid crystal layer 200 be gradually strengthened from the two sides of the groove 121 to the center of the groove 121, and the electric field force of the pixel electrode 130 to the liquid crystal molecules in the liquid crystal layer 200 is gradually weakened from the two sides of the groove 121 to the center of the groove 121, which can eliminate the tolerance caused by the processing technology to a certain extent and make the level of case of deflection of the liquid crystal molecules everywhere be kept same.

Figure 6:
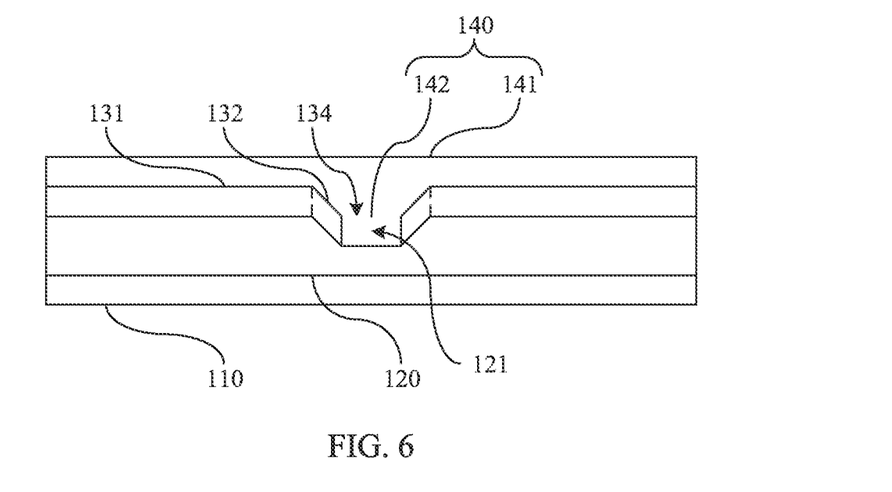
FIG. 6 is a structural schematic diagram of an array substrate provided by a fourth embodiment of the present application.

In some embodiments of the present application, please refer to FIG. 6, the above-mentioned groove 121 is in a constricted shape from a groove opening to a groove bottom, and the cross section of the groove 121 is in shapes such as a trapezoid, a triangle, an arc, and the like, so that the thickened film layer 142 is gradually thickened from two sides to the middle, and thus the anchoring force of the thickened film layer 142 to the liquid crystal molecules in the liquid crystal layer 200 is gradually strengthened from two sides to a middle of the area directly opposite to the slit 134. Since the farther away from an electrode plate the electric field of the area directly opposite to the slit 134 is, the weaker the electric field of the area directly opposite to the slit 134 is, a structure of the groove 121 may make the level of case of deflection of the liquid crystal molecules everywhere be kept same, which prevents a situation that the liquid crystal molecules at the edge of the area directly opposite to the slit 134 are deflected more easily and brightness is higher. At a same time, cost of producing the alignment film is also saved.

In an embodiment of the present application, the groove walls on two sides of the above-mentioned groove 121 are inclined, so that the cross section of the groove 121 is in an isosceles trapezoid shape. At a same time, the pixel electrode 130 includes a main body portion 131 and a plurality of extension portions 132. The main body portion 131 is defined with the above-mentioned slits 134. The extension portions 132 are arranged corresponding to the slits 134, are connected to sidewalls of the slits 134, and protrude into the groove 121. The extension portions 132 are attached to the groove walls of the groove 121. A side of the extension portions 132 facing away from the buffer layer 120 is also inclined and parallel to the groove walls of the groove 121, so that the thickening film layer 142 of the first alignment film 140 is gradually thickened from two sides to the middle, and meanwhile the electric field of the area directly opposite to the groove 121 is controlled to decrease slowly, which makes the anchoring force of the first alignment film 140 to the liquid crystal molecules in the liquid crystal layer 200 be gradually strengthened from the groove walls on the two sides of the groove 121 to a center line, and the electric field force of the pixel electrode 130 to the liquid crystal molecules in the liquid crystal layer 200 is gradually weakened from the groove walls on the two sides of the groove 121 to the center line, which makes the level of case of deflection of the liquid crystal molecules everywhere be kept same.

The color filter substrate 300 includes a second substrate 310, a common electrode 320, and a second alignment film 330.

The second substrate 310 is a flat plate layer, and is arranged opposite to the first substrate 110 for carrying the common electrode 320 and the second alignment film 330. Both the common electrode 320 and the second alignment film 330 are arranged on a side of the second substrate 310 facing the first substrate.

The second alignment film 330 is attached to the liquid crystal layer 200. The second alignment film is also generally made of materials such as polyimide (PI), and is a thin film-like film layer. The second alignment film 330 is used to cooperate with the first alignment film 140 to provide the anchoring force to the liquid crystal molecules in the liquid crystal layer 200, so as to form the defined pre-tilt angle.

The common electrode 320 is arranged on a side of the second alignment film 330 facing away from the liquid crystal layer 200, and is attached to the second alignment film 330, so as to form an electric field together with the pixel electrode 130. The common electrode 320 is generally made of a transparent conductive material such as indium tin oxide (ITO). In some embodiments of the present application, the common electrode 320 may also be defined with the slits 134 to control a tilt angle of the liquid crystal molecules in the liquid crystal layer 200.

A display panel and the array substrate 100 thereof provided by the embodiments of the present application have been introduced in detail above. Specific examples are applied herein to explain the principles and embodiments of the present application, but the description of the above embodiments is only used to help understand the methods and the core idea of the present application. At the same time, for those ordinary skilled in the art, there will be changes in the specific embodiments and disclosure scopes based on the ideas of the present application. In conclusion, the content of this description should not be construed as a limitation to the present application.

What is claimed is:

1. An array substrate, comprising:
    a buffer layer, a side of the buffer layer defined with a plurality of grooves;
    a pixel electrode arranged on the side of the buffer layer that is defined with the grooves, wherein the pixel electrode is defined with a plurality of slits, and the plurality of slits are arranged in a one-to-one correspondence with the plurality of the grooves; and
    a first alignment film arranged on a side of the pixel electrode facing away from the buffer layer and filling the grooves and the slits, and a side of the first alignment film facing away from the pixel electrode being a flat surface,
    wherein the first alignment film comprises a main body film layer and a thickening film layer that are integrally formed, the main body film layer is attached to the pixel electrode, and the thickening film layer is arranged on a side of the main body film layer facing the pixel electrode and fills the grooves and the slits,
    a side of the main body film layer away from the pixel electrode and the buffer layer is a flat surface, and
    a width of one of the grooves is greater than a width of a corresponding one of the slits to ensure that the thickening film layer completely covers an area directly opposite to the corresponding slit defined on the pixel electrode.

2. The array substrate as claimed in claim 1, wherein a depth of the groove is no more than 10% of a maximum thickness of the first alignment film.

3. The array substrate as claimed in claim 1, wherein a depth of the groove is no more than 0.01 micrometers.

4. A display panel, comprising:
    an array substrate comprising:
        a buffer layer, a side of the buffer layer defined with a plurality of grooves;
        a pixel electrode arranged on the side of the buffer layer that is defined with the grooves, wherein the pixel electrode is defined with a plurality of slits, and the plurality of slits are arranged in a one-to-one correspondence with the plurality of the grooves; and
        a first alignment film arranged on a side of the pixel electrode facing away from the buffer layer and filling the grooves and the slits, and a side of the first alignment film facing away from the pixel electrode being a flat surface,
        wherein the first alignment film comprises a main body film layer and a thickening film layer that are integrally formed, the main body film layer is attached to the pixel electrode, and the thickening film layer is arranged on a side of the main body film layer facing the pixel electrode and fills the grooves and the slits, a side of the main body film layer away from the pixel electrode and the buffer layer is a flat surface, and a width of one of the grooves is greater than a width of a corresponding one of the slits to ensure that the thickening film layer completely covers an area directly opposite to the corresponding slit defined on the pixel electrode;
    a liquid crystal layer, arranged on a side of the array substrate and attached to the first alignment film;
    a color filter substrate arranged on a side of the liquid crystal layer facing away from the array substrate and attached to the liquid crystal layer.

5. The display panel as claimed in claim 4, wherein the color filter substrate comprises:
    a second alignment film attached to the liquid crystal layer;
    a common electrode arranged on a side of the second alignment film facing away from the liquid crystal layer and attached to the second alignment film.

6. The display panel as claimed in claim 5, wherein the common electrode is also defined with slits.

7. The display panel as claimed in claim 4, wherein a depth of the groove is no more than 10% of a maximum thickness of the first alignment film.

8. The display panel as claimed in claim 4, wherein a depth of the groove is no more than 0.01 micrometers.

* * * * *

UNITED STATES PATENT AND TRADEMARK OFFICE
CERTIFICATE OF CORRECTION

PATENT NO. : 12,298,630 B2  
APPLICATION NO. : 17/790189  
DATED : May 13, 2025  
INVENTOR(S) : Yuchen Hou Page 1 of 1

It is certified that error appears in the above-identified patent and that said Letters Patent is hereby corrected as shown below:

On the Title Page

In Item (30) Foreign Application Priority Data:
"20221057436.4"
Should be changed to:
--202210574736.4--

Signed and Sealed this  
Fifth Day of August, 2025

Coke Morgan Stewart  
*Acting Director of the United States Patent and Trademark Office*